March 17, 1964     T. VAN DUIJVENDIJK ETAL     3,125,376
SAFETY BELT
Filed June 13, 1962     3 Sheets-Sheet 1
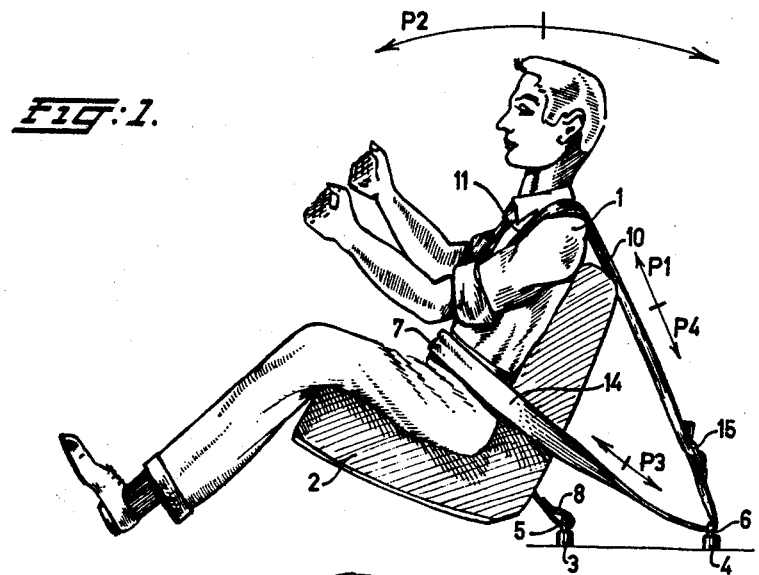
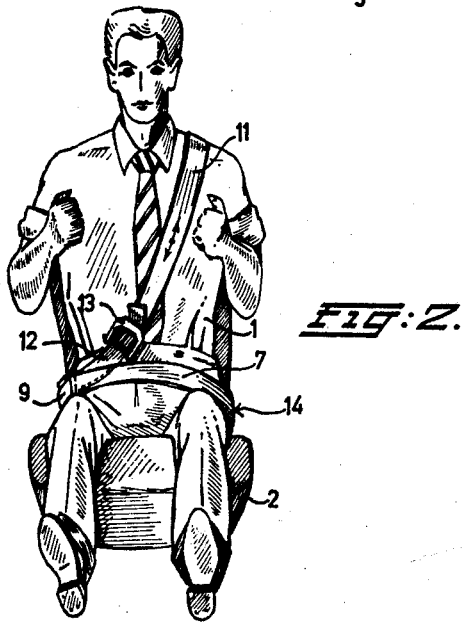
GERRIT VAN ESSEN
TOMMY VAN DUIJVENDIJK
INVENTORS
BY
ATTORNEY

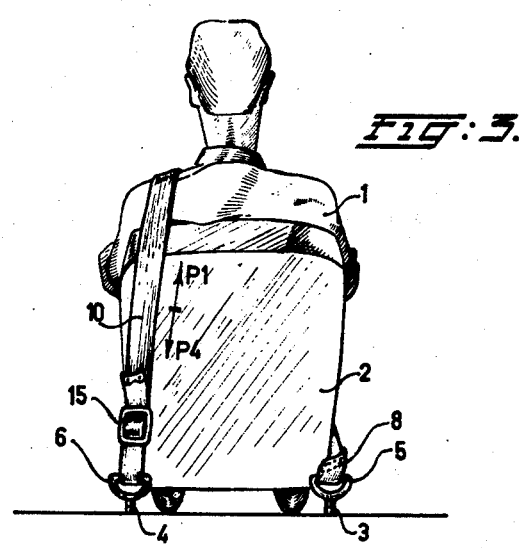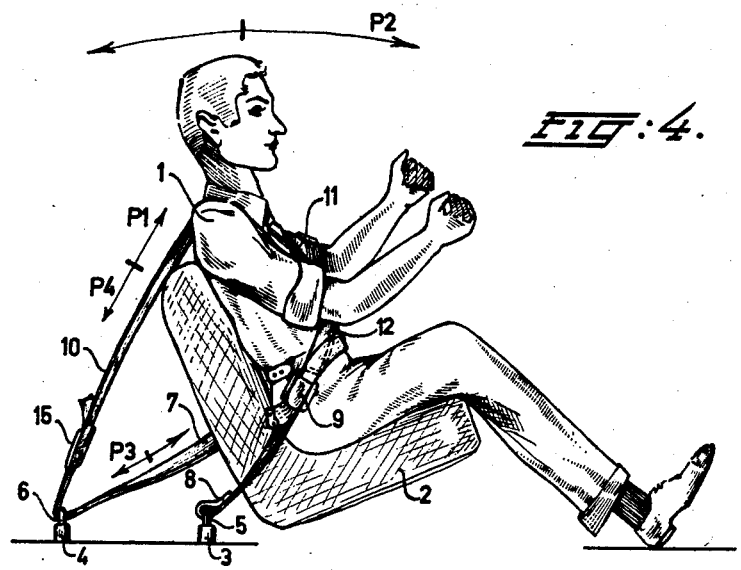

March 17, 1964   T. VAN DUIJVENDIJK ETAL   3,125,376
SAFETY BELT
Filed June 13, 1962   3 Sheets-Sheet 3

GERRIT VAN ESSEN
TONNY VAN DUIJVENDIJK
INVENTORS

BY
ATTORNEY

United States Patent Office 3,125,376
Patented Mar. 17, 1964

3,125,376
SAFETY BELT
Tonny van Duijvendijk, Riouwstraat 88c, The Hague, Netherlands, and Gerrit van Essen, Veldweg 2, Malden, Nijmegen, Netherlands
Filed June 13, 1962, Ser. No. 202,114
Claims priority, application Netherlands June 14, 1961
7 Claims. (Cl. 297—389)

The invention relates to safety belts for use with seats in vehicles, and which are of the type provided with means for attachment to fastening points situated rearwardly of the body axis and including at least one shoulder strap and a lower cross strap.

The chance for occupants of motor cars to survive a traffic accident without being badly injured is at least doubled if it is possible to prevent them from being cast from the vehicle and/or flung against the dashboard or windshield and steering column. In view of the construction of present day automotive vehicles, the best, and probably the only practical means for achieving the foregoing objectives are the so called safety belts.

Extensive research by various investigators has demonstrated the manner in which the human body will behave during the most common types of collisions and data has been collected relating to the forces exerted by the body on the means by which it is more or less fixed or retained at its location within the vehicle.

Research in connection with the ejection of personnel from fast planes has resulted in a great deal of information as to the capacity of the human body to resist very great stresses, which are exerted for a short time and act on the body from various directions.

Many different types of safety belts have been produced for use in automotive vehicles, and the experience gained in connection with such belts has induced the authorities in various countries to establish, by law, requirements which have to be met by manufacturers or to promulgate statutory suggestions concerning the strength of the belts which are to be sold and the fittings belonging thereto, such as, buckles, closures, fastening means etc. As a result thereof, all of the various kinds and makes of safety belts which are produced have closures and attachments of sufficient strength to resist the forces which the human body could exert thereon in the event of a collision.

Another question of at least equal importance is, however, whether the human body is also capable of sustaining those forces without receiving major injuries. The way in which the body will encounter these forces, the places in which the forces will be applied and the magnitude of these forces per unit of surface are directly related to the way in which the safety belt is applied to the body and the extent to which the belt allows or does not allow for movement.

An exact analysis of the movement of the human body in the event of collision, taking into account the various possibilities for more or less restraining the body, reveals that all safety belts known at present have imperfections. In many cases the permissible movement of the body or parts of the body is too great (with single pelvis belt, single diagonal belt); and in other cases the permissible movement is too small leading to a great risk of fracture of the cervical vertebrae). With still other constructions the body is free to slip downwardly or forwardly, whereby the stomach-liver area can be exposed to a great pressure.

It is an object of the invention to provide a safety belt which avoids the above disadvantages of existing belts; and whereby the forces acting on the human body are held as small as possible and only applied at those locations where the body can withstand the same without being badly injured or bruised and without exposing the occupant to a fracture of the cervical vertebrae or the backbone.

It is a further object of the invention to ensure that the upper part of the body can undergo limited forward movement, whereby an advantageous condition is obtained for meeting considerable changes of velocity which could cause the head to be thrown back, while the pinch is limited and the pelvis strap is pulled in the right direction and applied to the strong parts of the body.

It is still another object of the invention to effect, in response to the movement in a forward direction of the upper part of the body (whereby the pressure exerted on that upper part of the body is considerably reduced), a tightening of the pelvis strap which ensures that the pelvis strap is continuously applied to the right location (the pelvis), and cannot be pulled upwardly, so that the body cannot slip downwardly.

Due to the limited freedom of movement of the upper part of the body in a forward direction, the part of the body at the level of the pelvis strap acts as a center of rotation. The movement referred to is necessary in order to protect the cervical vertebrae, as otherwise the head may be thrown backwardly during the great variation in acceleration (at a force greater than 16 g.).

The invention is further described in detail with reference to the drawings in which two embodiments are shown, and wherein:

FIG. 1 is a side elevational view of a seated person held in position by a safety belt embodying this invention;

FIGS. 2, 3 and 4 are respectively front, back and opposite side elevational views of the seated person held in position by the safety belt of FIG. 1.

Figure 5:
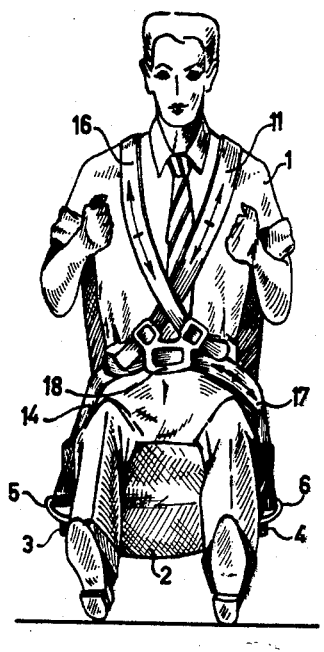
FIGS. 5 and 6 are respectively front and back elevational views of a seated person held in position by a safety belt in accordance with another embodiment of the invention.

Referring to FIGS. 1–4 in detail, it will be seen that the person protected by means of the safety belt is indicated at 1, while the seat is indicated at 2. Low behind the seat there are provided two fastening fittings 3 and 4, which have slotted lugs 5 and 6, and which are fixedly secured to the bottom of a motor vehicle for instance. One end of the pelvis strap 7 is fixedly secured to the lug 5 by way of a closed loop 8. The pelvis strap consists of two parts which are separably connected by means of a conventional buckle 9. The buckle 9 may be of any existing type which permits the parts of the pelvis strap to be rapidly connected and disconnected and which also allows adjustment of the effective length of the pelvis strap. This pelvis strap 7 runs slidably through the slotted lug 6 of the other fastening fitting 4 and is connected, for example, by a buckle 15, with a portion 10 of the shoulder strap which extends upwardly behind the left back portion of the person 1. The remaining portion 11 of the shoulder strap is led over the shoulder and runs diagonally across the chest for connection to a short strap length 12 which is secured to the pelvis strap 7. A buckle 13 can be employed for connecting the shoulder strap portion 11 to the strap length 12 and for adjusting the effective length of the shoulder strap.

As the shoulder strap runs diagonally over the breast the breast bone, which can receive great forces, and the strong upper part of the chest are loaded. By disconnecting the buckle 9 the shoulder strap 11 together with the portion 14 of the pelvis strap 7 can be moved to one side and the other portion of the pelvis strap secured to fitting 3 (see FIGURE 4) can be moved to the other side. The user can in this way quickly disengage from the safety belt.

When a collision occurs, the vehicle with the seat 2 is abnormally slowed down and the body of the person 1 is moved forwardly in respect of the seat by its own inertia. This can also be contemplated as a relative backward movement of the seat in respect to the person. By reason of this relative movement, the upper part of the body will, in the first place, move forwardly with a great acceleration, while the lower part of the body remains behind as a result of the friction and inclination of the seat. The shoulder strap 10 is pulled in the direction of the arrow P1 as a result of the forward movement of the shoulder, as represented by the arrow P2. Consequently the pelvis strap 7 is tightened in the direction of the arrow P3, for the continuous or connected straps 7, 10 can slide through the slotted lug 6, with a certain amount of braking being produced owing to the friction in the lug, whereby the forward movement of the upper part of the body in the direction of the arrow P2 is braked. The pelvis strap 7 is thus increasingly tightened. The above mentioned braking of the forward movement of the top part of the body increases as the pelvis belt 7 is increasingly tightened. This is advantageous in that the pelvic region of person 1 is drawn toward the rear of the seat so that the head and the upper part of the body cannot move forwardly from the seat to the extent necessary for contact with the windshield or dashboard. As the upper part of the body assumes a forwardly inclined position and the pelvic portion is securely held in place by the low situated pelvis strap 7 which is pulled in a backward and downward direction to the fastening fittings 3 and 4, it is evident that the body cannot slide forwardly and downwardly from under the belt owing to the inertia of the large mass of lower and upper legs, thereby avoiding a common defect of known safety belts and which can give rise to complicated leg fractures.

Due to the first relative acceleration of the upper part of the body with respect to the seat, the upper part of the body and the head assume a sharply forwardly inclined position, and this is made possible by the sliding movement of connected straps 7 and 10 through the lug 6. Such forwardly inclined position of the head and upper part of the body prevents fracture of the cervical vertebrae when the collision results in braking or deceleration forces which sharply increase and decrease at a rapid rate, as is often the case.

With the safety belt according to the invention, the relative forces of acceleration attending a sharp decrease in deceleration and which would tend to throw the head backwardly, act substantially in the direction of the forwardly inclined axis of the head and upper part of the body assumed at the beginning of the collision.

Since the point of attachment of the front portion 11 of the shoulder strap to the pelvis strap 7 is situated at the right of the axis of the body, the pull forces on the shoulder strap 10, 11 are transmitted, as directly as possible, to the fittings 3 and 4. As the pull on the pelvis strap is applied at the side thereof fixedly secured to the fitting 3, the sliding movement of strap portion 14 through the lug 6 is not hampered. This is further ensured by disposing the short strap length 12 connected to the end of the shoulder strap 11 at an acute angle relative to the portion 14 of the pelvis strap.

The disposition of the fitting 4 at a location which is farther backward than the fitting 3 also contributes to this effect, and further ensures that the sliding movement through the lug 6 is less hampered by friction on the back of the seat and that the risk of the body being pinched in the shoulder strap is avoided.

The movement of strap 7, 10 through the lug 6 in the opposite direction, that is, in the direction of the arrow P4 is limited, by the buckle 15, the width of which is such that it cannot pass through the lug 6. The looseness of the pelvis strap 7 is thus limited so that the lower part of the body is prevented from moving too far away from the seat as could occur when, under special circumstances, thrusts are produced which are not substantially in a horizontal direction, e.g., in an upwardly slanting direction. In that case the sliding movement of the strap through the lug 6 is braked in a corresponding way, but in an opposite direction, and the forward movement of the lower part of the body is braked.

The single shoulder strap according to the FIGS. 1–4 will be disposed on that side which is remote from the door beside the seat, so that when the upper part of the body moves forwardly, as described above, it turns away from the vehicle door.

Figure 6:
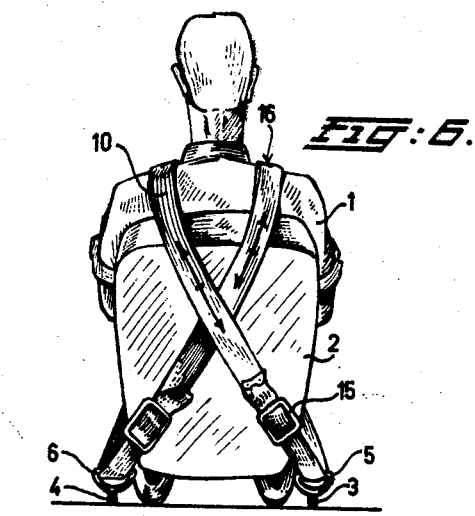

In the embodiment according to the FIGS. 5 and 6, there is provided a second shoulder strap 16, and both shoulder straps extend diagonally behind the back of the seat. The portions of the shoulder straps 16 and 10, 11 extending diagonally in back of the seat are connected with the ends of the pelvis strap portions 14, 17 respectively and both are capable of gliding or sliding through the lugs 6 and 5, respectively. The front ends of the shoulder straps may be connected to the pelvis strap by a combined buckle 18 which also connects the inner ends of pelvis strap portions 14 and 17. This buckle can be of the type which is usual for aircraft, but which is suitably modified to accommodate the criss-crossing of the shoulder straps.

In the embodiment according to FIGS. 5 and 6 the upper part of the body is uniformly protected at both sides against torsional forces, which can give rise to a fracture of the backbone. When, e.g., owing to these torsional forces the shoulder engaged by the strap 16 sways forwardly and the shoulder engaged by the strap 11 sways backwardly, the sliding movements of the related shoulder strap portions through the lugs 5 and 6 are braked thereby to brake the torsional movement of the body. Further, due to the sliding movement of the shoulder straps through lugs 5 and 6, the occupant's pelvis can also turn in the same direction as the upper part of the body, and the braking action together with this possibility of pelvic movement prevent fractures of the backbone owing to torsion.

What we claim is:

1. A safety belt assembly for securing a human occupant in a vehicle seat having a bottom and back, said safety belt assembly comprising two laterally spaced apart fittings fixedly mounted in back of the seat at a level adjacent the bottom of the latter;

a first strap having its ends connected to said fittings to extend from the latter across the seat and thereby constitute a pelvis belt for an occupant of the seat, at least one of said fittings having a slot through which the end of said first strap attached thereto is longitudinally slidable; and at least a second strap secured at one end to said pelvis belt at a location along the latter which is offset from the center of said pelvis belt, said second strap extending upwardly from said pelvis belt over the back of the seat and then downwardly and having its other end joined to the end of said first strap which is slidable through one of said fittings so that said second strap constitutes a shoulder belt adapted to extend diagonally across the chest of an occupant of the seat, whereby rapid deceleration of the vehicle seat tends to throw the upper part of the occupant's body forwardly and causes frictionally braked slipping of said first strap through said slot of said one fitting for braking the forward movement of the upper part of the occupant's body and simultaneously tightening said pelvis belt.

2. A safety belt assembly as in claim 1; wherein said one fitting through which the first strap is slidable is disposed at the opposite side of the medial plane of the seat from that of said location at which said one end of the second strap is secured to said pelvis belt.

3. A safety belt assembly as in claim 1; further comprising stop means between said other end of the second strap and the end of said first strap joined thereto to limit sliding movement through said slot of the fitting in the direction loosening said pelvis belt.

4. A safety belt assembly as in claim 3; wherein said stop means is in the form of a buckle joining together said first and second straps and permitting adjustment of the effective length of said shoulder belt constituted by the latter.

5. A safety belt assembly as in claim 1; wherein the other of said fittings has the related end of said first strap fixedly secured thereto; and wherein said two fittings are substantially aligned with the opposite sides of the seat, and said one fitting is spaced rearwardly from the seat a substantially greater distance than said other fitting.

6. A safety belt assembly as in claim 1;
wherein the other of said fittings also has a slot through which the end of said first strap attached to said other fitting is longitudinally slidable; and
further comprising a third strap secured at one end to said pelvis belt at a location along the latter which is offset from the center of said pelvis belt at the side of said center remote from said location at which said second strap is secured to said pelvis belt, said third strap extending upwardly from said pelvis belt over the back of the seat and then downwardly and having its other end joined to the end of the first strap which is slidable through said other fitting, whereby said third strap also constitutes a shoulder belt.

7. A safety belt assembly as in claim 6;
wherein said one fitting and said other fitting are disposed at the same sides of the medial plane of the seat at said locations at which said second and third straps are respectively secured to the pelvis belt; and wherein said second and third straps are diagonally criss-crossed both in front and in back of the seat back.

References Cited in the file of this patent
UNITED STATES PATENTS

| | | |
|---|---|---|
| 2,576,867 | Wilson | Nov. 27, 1951 |
| 2,710,649 | Griswold | June 14, 1955 |
| 2,804,313 | Gilles | Aug. 27, 1957 |
| 2,864,437 | Spring | Dec. 16, 1958 |
| 3,043,625 | Bohlin | July 10, 1962 |

FOREIGN PATENTS

| | | |
|---|---|---|
| 1,186,353 | France | Feb. 23, 1959 |
| 865,504 | Great Britain | Apr. 19, 1961 |